US012656317B2

(12) United States Patent
Belanger et al.

(10) Patent No.:  US 12,656,317 B2
(45) Date of Patent:  Jun. 16, 2026

(54) NONDESTRUCTIVE TESTING SYSTEM AND METHOD USING REFLECTED SHEAR HORIZONTAL GUIDED WAVES

(71) Applicant: ECOLE DE TECHNOLOGIE SUPERIEURE, Montréal (CA)

(72) Inventors: Pierre Belanger, Montreal (CA); André Dionne, Montreal (CA); Aurélien Thon, Montreal (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 673 days.

(21) Appl. No.: 18/108,740

(22) Filed: Feb. 13, 2023

(65) Prior Publication Data

US 2023/0288374 A1      Sep. 14, 2023

Related U.S. Application Data

(60) Provisional application No. 63/309,248, filed on Feb. 11, 2022.

(51) Int. Cl.
 *G01N 29/04*        (2006.01)
 *G01B 17/02*        (2006.01)
         (Continued)

(52) U.S. Cl.
 CPC ........... *G01N 29/041* (2013.01); *G01B 17/02* (2013.01); *G01N 29/07* (2013.01);
         (Continued)

(58) Field of Classification Search
 CPC ................. G01N 29/041; G01N 29/07; G01N 29/2412; G01N 2291/011; G01N 2291/0234; G01N 2291/02854; G01N 2291/0289; G01N 2291/106; G01N 29/262; G01N 29/48; G01N 29/11; G01N 29/04; G01N 29/30; G01N 29/069; G01N 2291/0422; G01N 29/4463; G01N 29/043; G01N 2291/044; G01N 2291/023;

(Continued)

(56) References Cited

U.S. PATENT DOCUMENTS

2011/0041612 A1* 2/2011 Paige ................. G01N 29/2412
                                                73/623

OTHER PUBLICATIONS

"Improvement of SH-wave EMAT phased array inspection by new eight segment probes"; Enami et al.; Nuclear Engineering and Design 198 (2000) 153-163 (Year: 2000).*

(Continued)

*Primary Examiner* — Daniel S Larkin
*Assistant Examiner* — Anthony W Megna Fuentes
(74) *Attorney, Agent, or Firm* — NORTON ROSE FULBRIGHT CANADA LLP

(57) ABSTRACT

A method and a system for nondestructive testing of a structure are provided. At least one ultrasonic probe is driven to cause at least one shear horizontal (SH) guided wave to propagate in the structure. At least one reflected guided wave signal is received from the structure to the at least one ultrasonic probe being driven. A comparison between an amplitude of the at least one reflected guided wave signal and an amplitude threshold is performed. A thickness of the structure is determined based on the comparison and a presence or an absence of at least one defect in the structure is detected based on the thickness as determined.

20 Claims, 9 Drawing Sheets

(51) Int. Cl.

| | |
|---|---|
| *G01N 29/07* | (2006.01) |
| *G01N 29/11* | (2006.01) |
| *G01N 29/24* | (2006.01) |
| *G01N 29/26* | (2006.01) |
| *G01N 29/48* | (2006.01) |

(52) U.S. Cl.
CPC .................... *G01N 29/2412* (2013.01); *G01N 2291/011* (2013.01); *G01N 2291/0234* (2013.01); *G01N 2291/02854* (2013.01); *G01N 2291/0289* (2013.01); *G01N 2291/106* (2013.01)

(58) Field of Classification Search
CPC ......... G01N 2291/267; G01N 29/4454; G01N 21/88; G01B 17/02
See application file for complete search history.

(56) References Cited

OTHER PUBLICATIONS

Adams et al. "An Adaptive Array Excitation Scheme for the Unidirectional Enhancement of Guided Waves." IEEE transactions on ultrasonics, ferroelectrics, and frequency control vol. 64,2 (2017): 441-451. doi: 10.1109/TUFFC.2016.2628100.

Alleyne et al., "The Reflection of Guided Waves From Circumferential Notches in Pipes." ASME. J. Appl. Mech. Sep. 1998; 65(3): 635-641.

Alleyne et al., "Rapid, Long Range Inspection of Chemical Plant Pipework Using Guided Waves", Aug. 2004, Key Engineering Materials 270-273:434-441. DOI: 10.4028/www.scientific.net/KEM.270-273.434.

Alleyne et al., "A two-dimensional Fourier transform method for the measurement of propagating multimode signals", The Journal of the Acoustical Society of America 89, 1159 (1991); doi: 10.1121/1.400530.

Belanger et al. "Guided Wave Diffraction Tomography Within the Born Approximation", IEEE transactions on ultrasonics, ferroelectrics, and frequency control vol. 57,6 (2010): 1405-18. doi:10.1109/TUFFC.2010.1559.

Belanger, Pierre, "High order shear horizontal modes for minimum remnant thickness." Ultrasonics vol. 54,4 (2014): 1078-87. doi:10.1016/j.ultras.2013.12.013.

Cawley, Peter, "Practical Long Range Guided Wave Inspection-Applications to Pipes and Rail." National Seminar of ISNT Chennai, Dec. 5-7, 2002.

Cheeke, J.D.N., Fundamentals and Applications of Ultrasonic Waves, CRC Press, 2012 by Taylor & Francis Group, LLC, ISBN: 13: 978-1-4398-5498-3.

Potts et al., "The dynamic mechanical properties of human skin in vivo." Journal of biomechanics vol. 16,6 (1983): 365-72. doi:10.1016/0021-9290(83)90070-2.

Drozdz et al. "Efficient Numerical Modelling of Absorbing Regions for Boundaries of Guided Waves Problems." Quantitative Nondestructive Evaluation 820 (2006): 126-133, doi:10.1063/1.2184520.

Hirao et al., "An SH-wave EMAT technique for gas pipeline inspection." Ndt & E International 32 (1999): 127-132.

Huthwaite et al., "High-resolution guided wave tomography, Wave Motion", AIP Conf. Proc. 1511, 729-736 (2013) doi:10.1063/1.4789118.

Huthwaite, P., "Accelerated finite element elastodynamic simulations using the GPU", Journal of Computational Physics 257 (2014) 687-707, doi:10.1016/j.jcp.2013.10.017.

Khalili et al., "Excitation of Single-Mode Lamb Waves at High-Frequency-Thickness Products." IEEE transactions on ultrasonics, ferroelectrics, and frequency control vol. 63,2 (2016): 303-12. doi:10.1109/TUFFC.2015.2507443.

Li et al, "Implementing Guided Wave Mode Control by Use of a Phased Transducer Array", IEEE Transactions on Ultrasonics, Ferroelectrics, and Frequency Control, vol. 48, No. 3, pp. 761-768, May 2001, doi: 10.1109/58.920708.

Monkhouse et al., "Flexible interdigital PVDF transducers for the generation of Lamb waves in structures", Ultrasonics 35 (1997) 489-498, doi:10.1016/S0041-624X(97)00070-X.

Nakamura et al. "Mode Conversion and Total Reflection of Torsional Waves for Pipe Inspection." Japanese Journal of Applied Physics 52 (2013) 07HC14, doi:10.7567/JJAP.52.07HC14.

Nguyen et al. "Excitation of ultrasonic Lamb waves using a phased array system with two array probes: phantom and in vitro bone studies." Ultrasonics vol. 54,5 (2014): 1178-85. doi: 10.1016/j.ultras.2013.08.004.

Nurmalia et al., "Mode conversion behavior of SH guided wave in a tapered plate", NDT & E International ,45 (1): 156-161, 2011, doi:10.1016/j.ndteint.2011.10.004.

Dube, N., "Introduction to Phased Array Ultrasonic Technology Applications, R/D Tech Guideline", Olypum NDT, 2007, ISBN: 0-9735933-0-X.

Pavlakovicet al., "Disperse: A General Purpose Program for Creating Dispersion Curves", Review of Progress in Quantitative Nondestructive Evaluation, 1997, vol. 16, ISBN : 978-1-4613-7725-2.

Petcher et al. "Shear horizontal (SH) ultrasound wave propagation around smooth corners." Ultrasonics vol. 54,4 (2014): 997-1004. doi:10.1016/j.ultras.2013.11.011.

Ribichini, R., "Modelling of Electromagnetic Acoustic Transducers", 2011.

Rajagopal et al., "On the use of absorbing layers to simulate the propagation of elastic waves in unbounded isotropic media using commercially available Finite Element packages", NDT & E International 51:30-40, 2012, doi:10.1016/j.ndteint.2012.04.001.

Rao et al. "Guided Wave Tomography Based on Full-Waveform Inversion." IEEE transactions on ultrasonics, ferroelectrics, and frequency control vol. 63,5 (2016): 737-745. doi:10.1109/TUFFC.2016.2536144.

Rose et al., "Using ultrasonic guided wave mode cutoff for corrosion detection and classification." 1998 IEEE Ultrasonics Symposium. Proceedings (Cat. No. 98CH36102) 1 (1998): 851-854 vol. 1., doi: 10.1109/ULTSYM.1998.762277.

Rose, J., "Ultrasonic Guided Waves in Solid Media", Cambridge University Press, 2014, ISBN: 9781107273610, doi:10.1017/CBO9781107273610.

Travaglini et al., "Feasibility of high frequency guided wave crack monitoring", Structural Health Monitoring, 16(4), 2016, doi:10.1177/1475921716673567.

Yu et al., "Feature guided wave inspection of bond line defects between a stiffener and a composite plate" NDT & E International, 89:44-55, 2017, doi:10.1016/j.ndteint.2017.03.008.

Zhu et al., "Lamb wave generation and reception with time-delay periodic linear arrays: a BEM simulation and experimental study," in IEEE Transactions on Ultrasonics, Ferroelectrics, and Frequency Control, vol. 46, No. 3, pp. 654-664, May 1999, doi: 10.1109/58.764852.

* cited by examiner

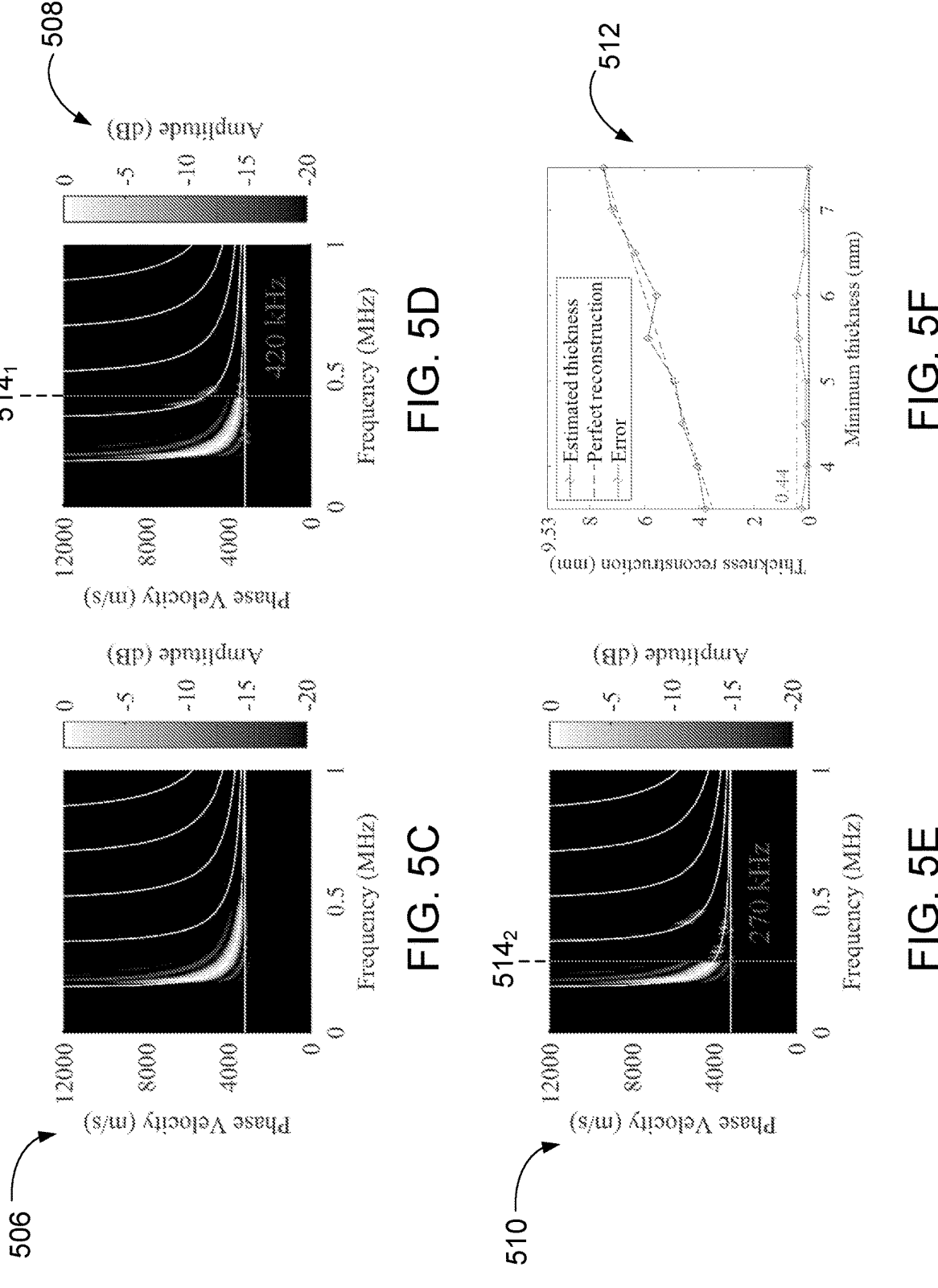

NONDESTRUCTIVE TESTING SYSTEM AND METHOD USING REFLECTED SHEAR HORIZONTAL GUIDED WAVES

FIELD

The improvements generally relate to the field of nondestructive testing, and, more particularly, to the use of ultrasonic guided waves for nondestructive testing.

INTRODUCTION OR BACKGROUND

The inspection of corroded structures is crucial across many industries. Affected areas are often difficult to access due to other impeding structures, such as pipe support or insulation. This makes standard thickness gauging methods such as point-by-point ultrasonic thickness gauging impossible.

The use of ultrasonic guided waves in nondestructive testing enables rapid inspections over long distances. In a pipe, several modes can propagate, such as flexural (axisymmetric and non-axisymmetric) and torsional modes (axisymmetric and non-axisymmetric). Various techniques are known to propagate waves in pipes and detect defects. While these techniques are suitable for their purposes, improvements are desired.

SUMMARY

In accordance with one aspect, there is provided a method for nondestructive testing of a structure. The method comprises driving at least one ultrasonic probe to cause at least one shear horizontal (SH) guided wave to propagate in the structure, receiving at least one reflected guided wave signal from the structure in response to driving the at least one ultrasonic probe, performing a comparison between an amplitude of the at least one reflected guided wave signal and an amplitude threshold, and determining a thickness of the structure based on the comparison and detecting, based on the thickness as determined, a presence or an absence of at least one defect in the structure.

In accordance with another aspect, there is provided a system for nondestructive testing of a structure. The system comprises an ultrasonic probe configured to be coupled to the structure and to cause, when driven, at least one shear horizontal (SH) guided wave to propagate in the structure, a processing unit, and a non-transitory computer-readable medium having stored thereon instructions executable by the processing unit for driving at least one ultrasonic probe, receiving at least one reflected guided wave signal from the structure in response to driving the at least one ultrasonic probe, performing a comparison between an amplitude of the at least one reflected guided wave signal and an amplitude threshold, and determining a thickness of the structure based on the comparison and detecting, based on the thickness as determined, a presence or an absence of at least one defect in the structure.

Many further features and combinations thereof concerning embodiments described herein will appear to those skilled in the art following a reading of the instant disclosure.

DESCRIPTION OF THE FIGURES

Reference is now made to the accompanying figures in which:

FIGS. 5C, 5D, 5E, and 5F illustrate simulation results obtained for a $SH_1$ propagation on a $\frac{3}{8}$ inches steel plate, in accordance with an illustrative embodiment.

It will be noticed that throughout the appended drawings, like features are identified by like reference numerals.

DETAILED DESCRIPTION

Figure 1:
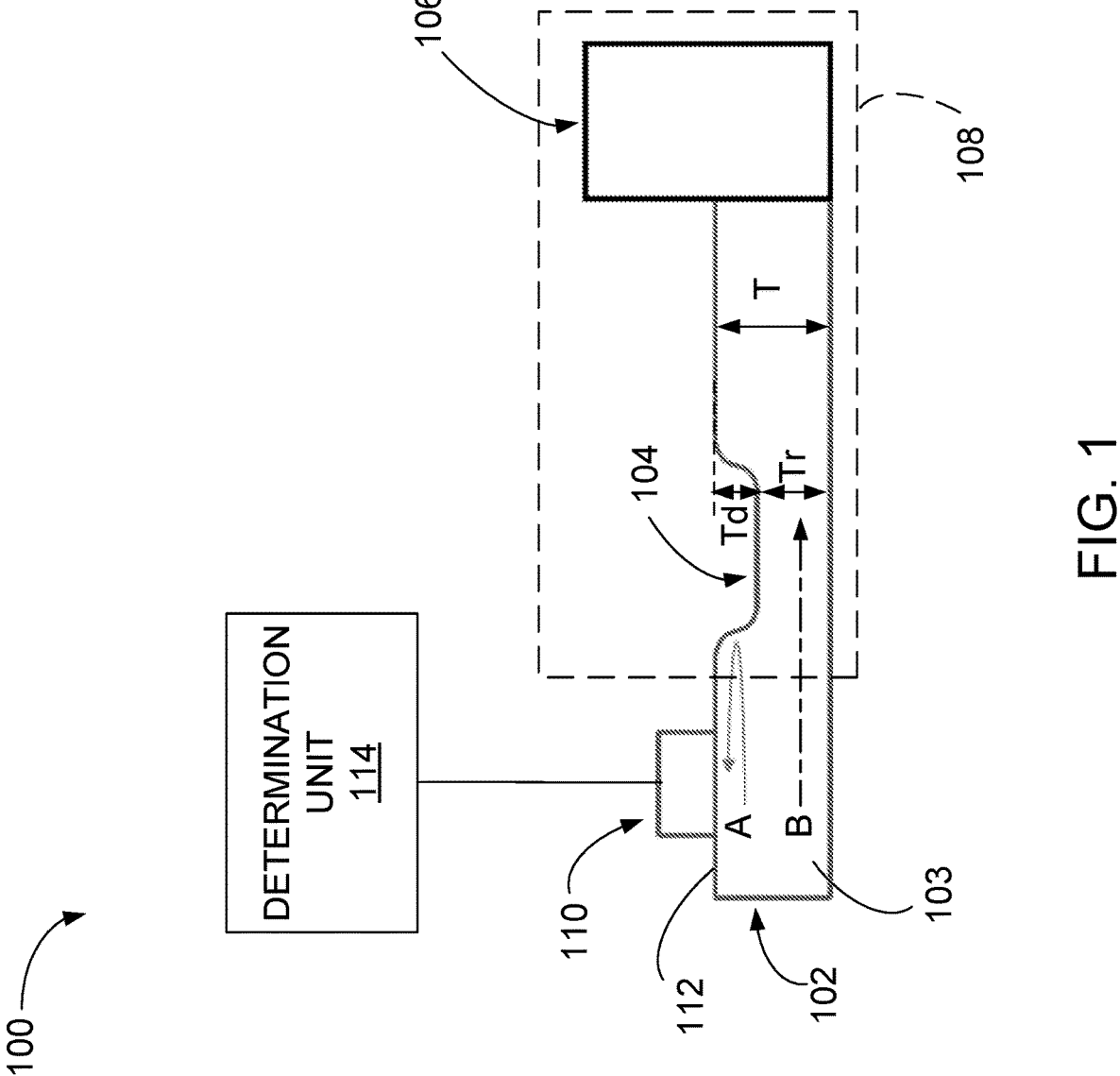
FIG. 1 is a schematic diagram of an example nondestructive testing system, in accordance with an illustrative embodiment.

The present disclosure is directed to systems and methods for nondestructive testing (or inspection) of objects including, but not limited to, steel pipes, using ultrasonic guided waves. Ultrasonic guided waves are mechanical perturbations that propagate between two boundaries forming a waveguide such as a plate or a pipe. In a plate, ultrasonic guided waves can be separated into Lamb waves (symmetrical and anti-symmetrical), and shear horizontal (SH) waves. Within each category, there are fundamental modes and high order modes. When impinging a defect or a feature parallel to the direction of polarization, SH waves will not convert to Lamb modes. In addition, the cutoff frequencies-thickness product of high-order SH modes are evenly distributed along the frequency-thickness product axis (indicative of the product of waveguide thickness and frequency), which allows the estimation of a thickness on regular intervals.

Equations (1) and (2) below are used to compute the phase and group velocity of SH modes:

$$V_{p,n} = V_S \left( \frac{2fb}{\sqrt{4(fb)^2 - n^2 V_s^2}} \right) \tag{1}$$

$$V_{g,n} = V_S \sqrt{1 - \frac{(n/2)^2}{(fb/V_S)^2}} \tag{2}$$

where $V_{p,n}$ and $V_{g,n}$ are respectively the phase and group velocity of the n-order mode, $V_S$ is the bulk shear wave velocity, f is the frequency, and b is the thickness of the waveguide. The fundamental mode $SH_0$ can propagate at all frequency-thickness products whereas high order modes are constrained to propagate only above a given cutoff frequency-thickness product. Below the cutoff frequency-thickness product, high order modes are considered as vanishing and their energy is reflected or converted into lower order modes. When the frequency-thickness product approaches the cutoff frequency-thickness product of high order modes, the mode's phase velocity tends towards infinity and the group velocity tends towards zero. This mode can no longer propagate and is then reflected or converted to a lower order mode. When a high order mode impinges an abrupt (i.e. sudden or discontinuous) thickness reduction, it will be converted to a lower order mode, and when the thickness of the waveguide allows, it may be converted back to its original state. Conversely, if the defect is smooth most of its energy will be reflected.

In metallic materials, corrosion is a chemical weathering by an oxidizer. This implies wear of the affected surfaces, which can be likened to a local loss of thickness. For a high-order SH mode, this will shift the frequency-thickness product below its cutoff frequency-thickness product. If the severity of the defect is sufficient, then the mode can reach its cutoff threshold. The energy of this mode will then no longer be able to propagate. Considering a plate of given thickness b, the cutoff frequency-thickness product of $SH_n$ can be obtained using equation (3):

$$fb = \frac{nV_S}{2} \qquad (3)$$

where $V_S$ is the bulk shear wave velocity. The use of multiple of modes makes it possible to increase the number of detection thresholds. However, the excitation and detection of high order mode become more complex as the frequency increases. The attenuation of a wave may be modeled using equation (4):

$$I = I_0 e^{-2\alpha x} \qquad (4)$$

where I is the intensity of the wave at a distance x from its source, $I_0$ is the initial intensity, and $\alpha$ is the attenuation coefficient depending on the material properties and increasing with the frequency. Further than attenuation, the ultrasonic wave is also subject to scattering when it encounters a defect. High-order modes can be described as dispersive. The difference between their phase and group velocities implies an alteration in the waveform in the time domain along with its propagation. These phenomena affect higher order modes more strongly. Their experimental uses over a large propagation distance are therefore more complex than for the first SH modes.

The systems and methods described herein use SH ultrasonic guided waves for nondestructive testing. In particular, it is proposed herein to analyze guided wave signal(s) reflected from a structure in order to determine a thickness of the structure and detect the presence or absence of one or more defects in the structure. When a defect is present in the structure, the structure's thickness at the location of the defect can be referred to as a "remaining", "residual" or "remnant" thickness.

Referring to FIG. 1, an example nondestructive testing system 100 will now be described. The system 100 is used to inspect a structure 102 (also referred to herein as a "structure under test" or a "structure under inspection"). The structure 102 is illustratively elongated (i.e. with a length greater than its transverse dimension or diameter) and comprises a wall 103 having a substantially uniform thickness T. In one embodiment, the structure 102 may be a curved object and the wall 103 may have a smooth curvature in the transverse direction (i.e. with no abrupt changes in thickness or orientation). The structure 102 may also be a wall- or plate-like structure. The structure 102 may include, but is not limited to, a pipe, rod, rail, rectangular conduit, cylindrical vessel, plate, wall, or hollow bar. The structure 102 may be made of any suitable solid material, including, but not limited to, a metal, ferromagnetic material, metal alloy, plastic, or the like. The structure 102 may be used in any suitable application or industry (e.g., oil and gas, pipelines, power stations, industrial plants, and the like), for instance to carry oil, gas, petrochemicals, water, coolants, or the like.

The structure 102 may comprise a defect 104, which, in the illustrated embodiment, is a reduced wall thickness arising from corrosion of the wall 103. In other words, the defect 104 corresponds to a region of the structure 102 (also referred to herein as a "corroded area") that is thinner than the thickness T of a surrounding region of the structure 102. The defect 104 may be due to a cavity (not shown) in the structure 102, the cavity being caused by corrosion. The cavity illustratively extends from a surface (e.g., an inner or outer surface) of the structure 102. In the illustrated embodiment, the defect 104 has a depth Td, which represents a portion of the original wall thickness T (i.e. a thickness reduction of the structure 102), such that the structure 102 has a remnant thickness Tr at the location of the defect 104, where T=Tr+Td. It should however be understood that defects other than corrosion-type defects may apply. It should also be understood that the defect 104 may be provided at any suitable location of the structure 102, such as in upper or lower parts of the structure 102. The structure 102 also comprises an impeding member 106, such as a pipe support or insulation. The defect 104 (e.g., the corroded area) and the impeding member 106 together form an area 108 (also referred to herein as a "partially accessible" or "inaccessible" area or zone) which is difficult to access.

An ultrasonic probe 110 is coupled to an outer surface 112 of the structure 102 for determining a thickness profile of the structure 102. As will be discussed further below, the probe 110 may be any suitable probe configured to allow the generation and the detection of SH guided waves. In some embodiments, a single probe 110 is used to sequentially generate and detect SH waves. In other embodiments, two probes 110 are used, a first probe for generation of SH waves and a second probe for detection of SH waves. Thus, although illustrated herein as one probe, it should be understood that the probe 110 may comprise one or more probes.

Figure 2:
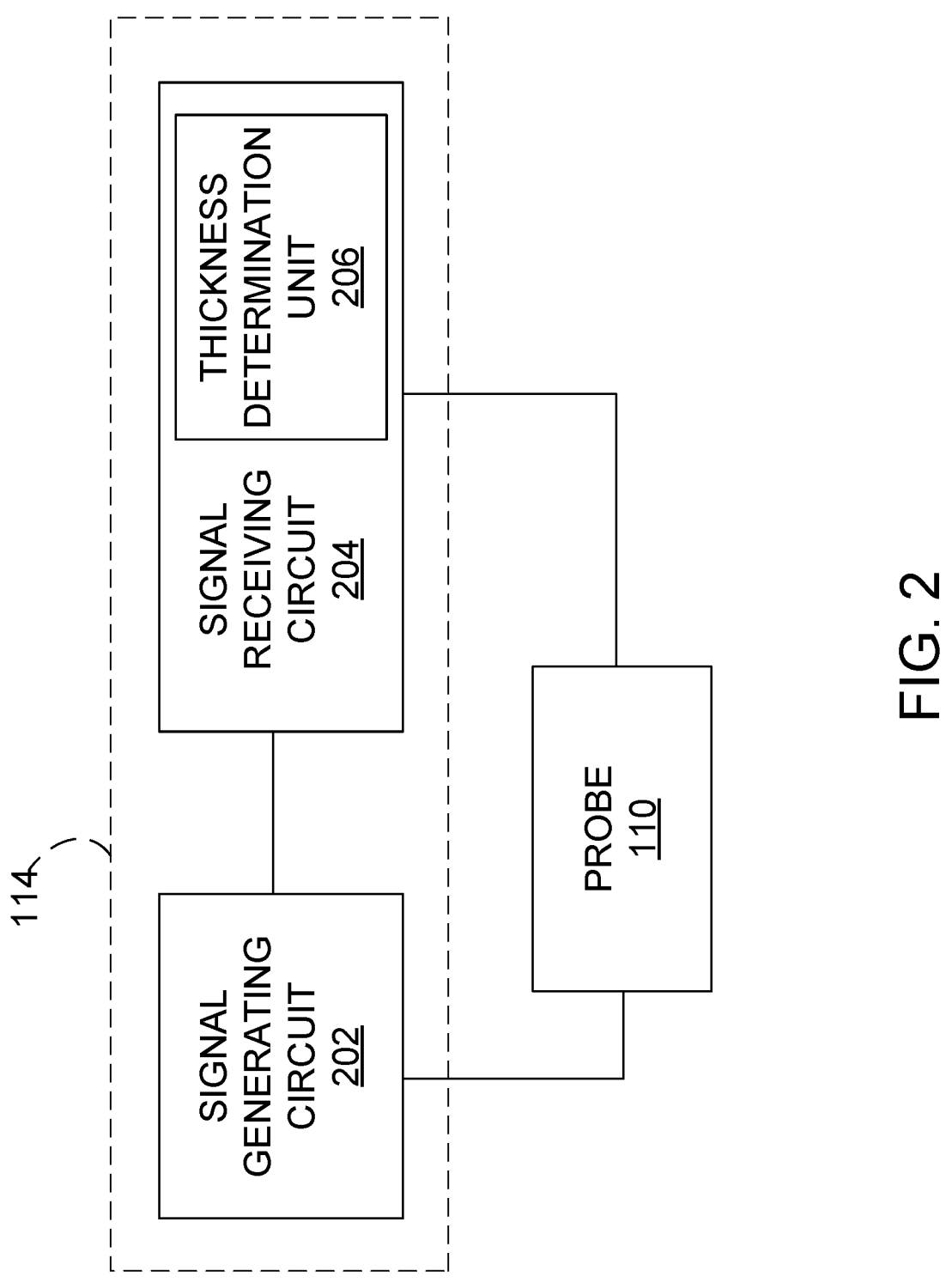
FIG. 2 is a block diagram of the determination unit of FIG. 1, in accordance with an illustrative embodiment.

The system 100 further comprises a determination unit 114 coupled to the probe 110 and configured to determine a thickness of the structure 102 based on reflection of the SH waves generated by the probe 110. As illustrated in FIG. 2, in one embodiment, the determination unit 114 comprises a signal generating circuit 202 and a signal receiving circuit 204 comprising a thickness determination unit 206. In the illustrated embodiment, the 150 electronic circuitry used for generating and detecting the SH waves (i.e. the signal generating circuit 202 and the signal receiving circuit 204) may be provided (e.g., packaged) separately from the probe 110. The probe 110 may then be connected (using any suitable connection means) to the signal generating circuit 202 and the signal receiving circuit 204. For example, a casing (not shown) may house the probe 110 and provide input and output ports for connection to the various circuitry needed to operate the probe 110. In other embodiments, 155 the electronic circuitry used for generating and detecting the SH waves may be incorporated into the probe 110.

The signal generating circuit 202 is configured to generate a signal (referred to herein as an "emission signal") and transmit the emission signal to the probe 110. In one embodiment, the emission signal is a radio frequency (RF) signal having a suitable frequency (e.g., in the order of tens or hundreds of kilohertz (kHz)) and a suitable shape. The probe 110 is then configured to convert the emission signal into a guided wave and to excite a given SH mode of the guided wave at a time.

Figure 3:
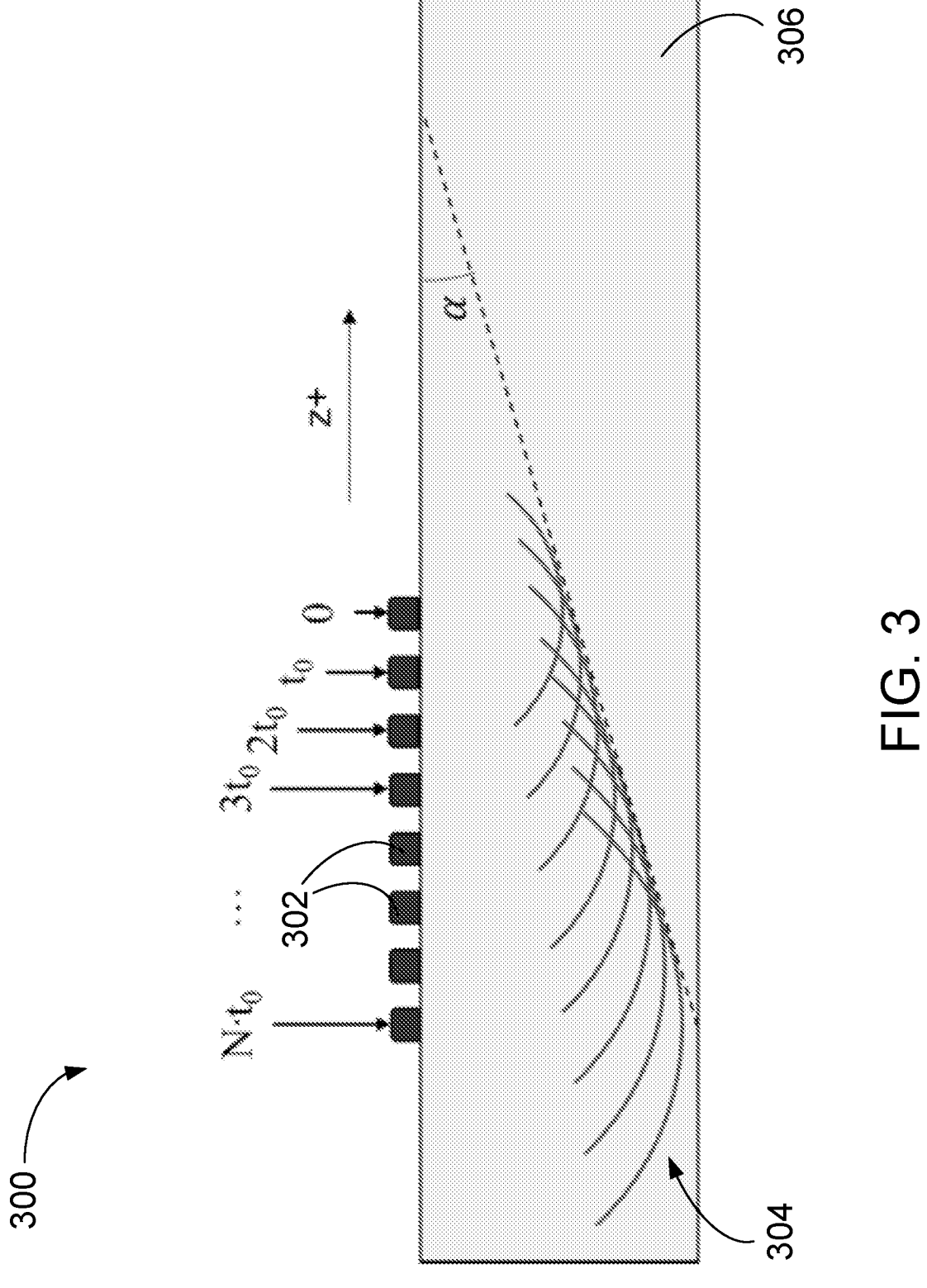
FIG. 3 is a schematic diagram of an ultrasonic phased array probe, in accordance with an illustrative embodiment.

In one embodiment illustrated in FIG. 3, the probe 110 is a multi-element probe, such as an ultrasonic phased array probe 300 comprising a plurality (N) of probe elements 302. The ultrasonic phased array probe 300 may be used to target a specific wavelength λ. The elementary pitch p (i.e. the pitch between two consecutive probe elements 302) may be selected to be smaller than the targeted wavelength λ, with $$\frac{p}{\lambda} \ll 1.$$

In this embodiment, the ultrasonic phased array probe 300 is able to excite high order guided wave modes at a constant phase velocity, independently of frequency. The phase velocity can be obtained as:

$$V_{ph} = \frac{p}{t_0} \quad (5)$$

where $V_{ph}$ is the phase velocity, p is the fixed elementary pitch, and $t_0$ is the delay in emission between two consecutive probe elements 302, the delay being selected in order to excite the desired phase velocity $V_{ph}$. In order to excite a specific phase velocity, the ultrasonic phased array probe 300 may be aligned with the desired direction of propagation (indicated as z+ in FIG. 3). A delay may then be added between each probe element 302, creating an angled plane wavefront 304. The delay required for each probe element 302 in order to excite a specific phase velocity may be written as:

$$t_i = \frac{p \times (i-1)}{V_{ph}} \quad (6)$$

where $t_i$ is the delay of element i, $V_{ph}$ is the targeted phase velocity, and p is the elementary pitch of the probe 300. The angle α of the transmitted wavefront 304 may be directly related to the shear velocity $(V_S)$ of the waveguide 306 and the targeted phase velocity $(V_{ph})$, as follows:

$$\alpha = a \sin \frac{V_S}{V_{ph}} \quad (7)$$

The wave transmitted into the waveguide 306 travels dominantly in the direction from the first emitting probe element to the last. When using an ultrasonic phased array transducer as in 300, the wavefront 304 is discretized with small elements in accordance with Huygens' principle, and the wavefront angle α can be changed. More specifically, the wavefront angle α and the bandwidth of the input signal may be controlled (e.g., using electronic circuits) by adjusting the number of signal cycles. The constant phase velocity excitation technique described herein may therefore be used to excite a large number of waveguide modes, using a single beam.

It should however be understood that other probes and excitation techniques may apply. For example, the probe 110 may comprise one or more comb transducers and comb excitation may be used to target a specific wavelength. In this case, mode selection may be based on the pitch between each probe element, with the pitch being a multiple or equal to the wavelength of the mode(s) of interest. The probe 110 may also comprise one or more electromagnetic acoustic transducers (EMAT). EMAT is a transducer technology consisting of an array of magnets and a coil and which uses either Lorentz forces, magnetostrictive forces or magnetization forces. In one embodiment, the probe 110 is as described in co-pending U.S. patent application Ser. No. 17/874,474 filed on Jul. 27, 2022, the entire contents of which are incorporated herein by reference. Other embodiments may apply. The probe 110 described and illustrated herein may therefore include, but is not limited to, a phased array probe, an EMAT, or an EMAT array.

Referring back to FIG. 1 and FIG. 2, the guided wave generated by the probe 110 (i.e. the excited SH mode) travels within the structure 102. The guided wave can be reflected (as indicated by arrow A in FIG. 1) at a discontinuity caused by the defect 104. The guided wave may also travel (as indicated by arrow B in FIG. 1) across the area where the defect 104 is present, such that the guided wave is transmitted across the structure 102. It should be understood that the guided wave may be partially or fully reflected, or partially or fully transmitted. The probe 110 (which is positioned on one side of the defect 104) may be configured to receive the reflected guided wave signal, as will be described further below. A second probe (not shown) may be positioned on an opposite side of the defect 104 in order to receive the transmitted (or converted) guided wave signal. Mode conversion may also occur as a result of propagation of the guided wave within the structure 102.

In some embodiments, due to the presence of the defect 104, the guided wave is fully reflected and no transmission occurs. Conversely, in other embodiments, due to the absence of any defect 104, the guided wave is fully transmitted across the defect 104, such that no reflection occurs. Following travel of the guided wave within the structure 102, the probe 110 may receive a reflected guided wave and converts the reflected guided wave into an electrical signal, referred to herein as a "reflected guided wave signal". The amplitude of the reflected guided wave signal may vary depending on whether the guided wave propagating within the structure 102 is partially reflected, fully reflected, partially transmitted, or fully transmitted. For example, the amplitude of the reflected guided wave signal is below a predetermined amplitude threshold when the guided wave is fully transmitted across the structure 102 due to the absence of the defect 104. The amplitude of the reflected guided wave signal is above the amplitude threshold when the guided wave is fully reflected within the structure 102 due to the presence of the defect 104 (referred to herein as a "gradual defect") causing a gradual (i.e. progressive or continuous) thickness change (or reduction). Such a gradual defect is in contrast to a defect referred to herein as an "abrupt defect" (i.e. a defect exhibiting a discontinuous change in thickness) which causes an abrupt thickness change.

The reflected guided wave received at the probe 110 is then fed to the signal receiving circuit 204, which is configured to process the received signal in order to determine the thickness of the structure 102. For this purpose, the thickness determination unit 206 is configured to compare the amplitude of the reflected guided wave signal to the amplitude threshold. The value of the amplitude threshold may be determined through testing (e.g., 235 before the nondestructive testing system 100 is deployed to inspect the structure 102) and stored in memory or other suitable storage. The value of the amplitude threshold may then be retrieved (e.g., by the thickness determination unit 206) from the memory or storage in order to perform the comparison.

When the amplitude of the reflected guided wave signal exceeds the amplitude threshold (indicating that the majority—i.e. more than half—of the guided wave signal is reflected due to the presence of the defect 104), the thickness determination unit 206 determines that the frequency-thickness product of the excited SH mode is below the cutoff frequency-thickness product. It can therefore be determined that the thickness of the structure 102 (i.e. the remnant thickness at the location of the defect 104) is below a minimal thickness for the structure 102, which in turn indicates the presence of a defect. The value of the minimal thickness may be determined through testing (e.g., before the nondestructive testing system 100 is deployed to inspect the structure 102) and stored in memory or other suitable storage for subsequent retrieval (e.g., by the thickness determination unit 206).

In some embodiments, when the entirety of the excited SH mode(s) is detected by the probe 110, the thickness determination unit 206 detects that a gradual defect as in 104 having a thickness corresponding to the cutoff frequency-thickness is present. When one (or more) lower order SH mode(s) is detected by the probe 110, the thickness determination unit 206 detects that an abrupt defect as in 104 having a thickness corresponding to the cutoff frequency-thickness is present. Moreover, in some embodiments, when the thickness determination unit 206 detects the presence of the defect 104 (based on the amplitude of the reflected guided wave signal and on the thickness as determined), the thickness determination unit 206 may further be configured to determine, based on the at least one reflected guided wave signal, a distance between the probe 110 and the location of the defect. In particular, the distance between the probe 110 and the location of the defect may be determined based on the group velocity of the reflected guide wave and on the amount of time that has elapsed between the moment the guided wave is generated by the probe 110 and the moment the reflected guided wave is received at the probe 110. The value of the distance may be obtained by multiplying the group velocity by the elapsed amount of time.

When the amplitude of the reflected guided wave signal is below the amplitude threshold (indicating that the majority of the guided wave signal is transmitted, with little to no guided wave signal being reflected), the thickness determination unit 206 determines that the frequency-thickness product of the excited SH mode is above the cutoff frequency-thickness product. It can therefore be determined that the thickness of the structure is above the minimal thickness, which indicates the absence of the defect 104. In other words, when no SH mode is detected by the probe 110, the thickness determination unit 206 determines that no defect as in 104 is present.

Figure 4A:
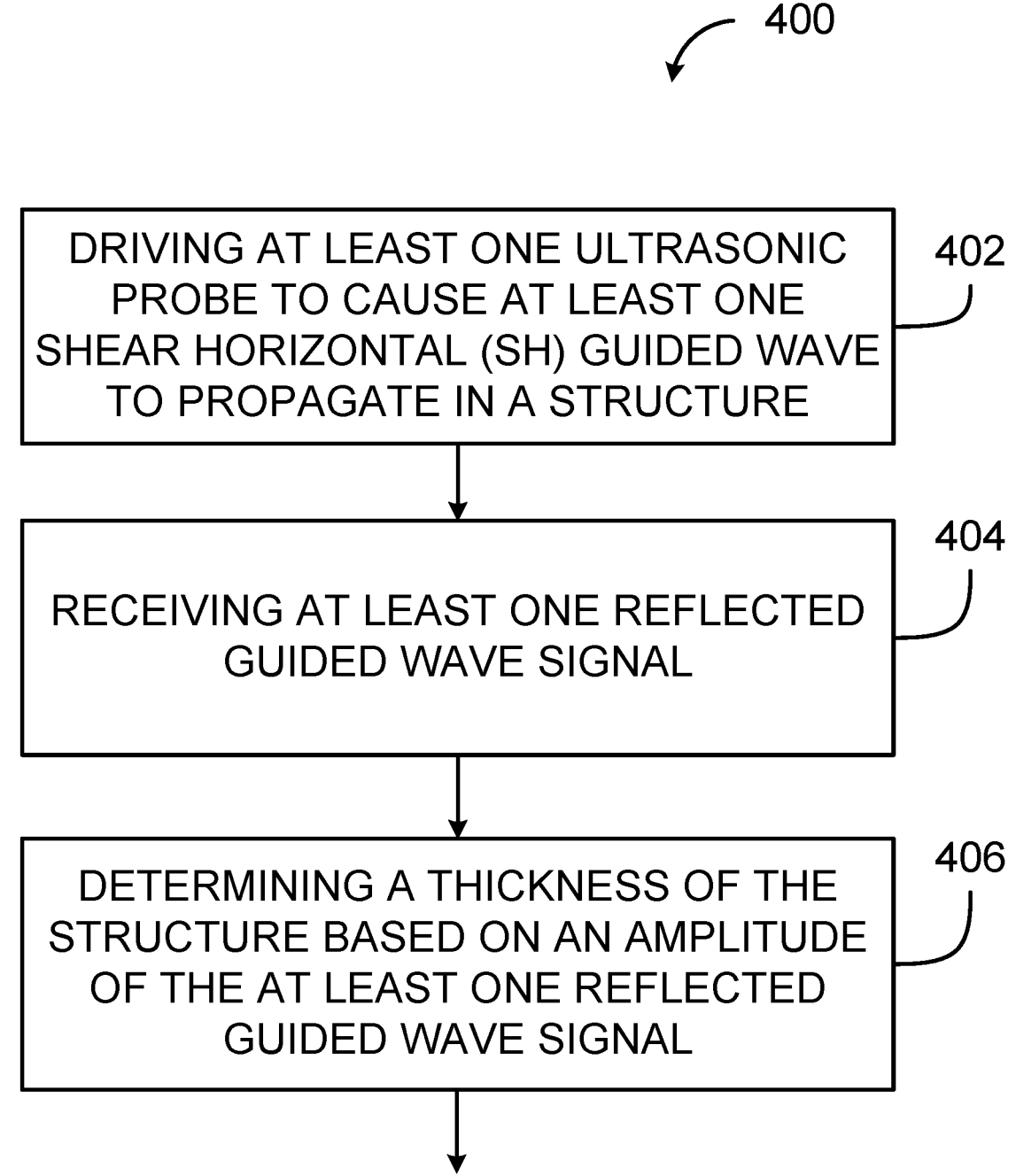
FIGS. 4A, 4B, and 4C are flowcharts of an example nondestructive testing method, in accordance with an illustrative embodiment.
Figure 4B:
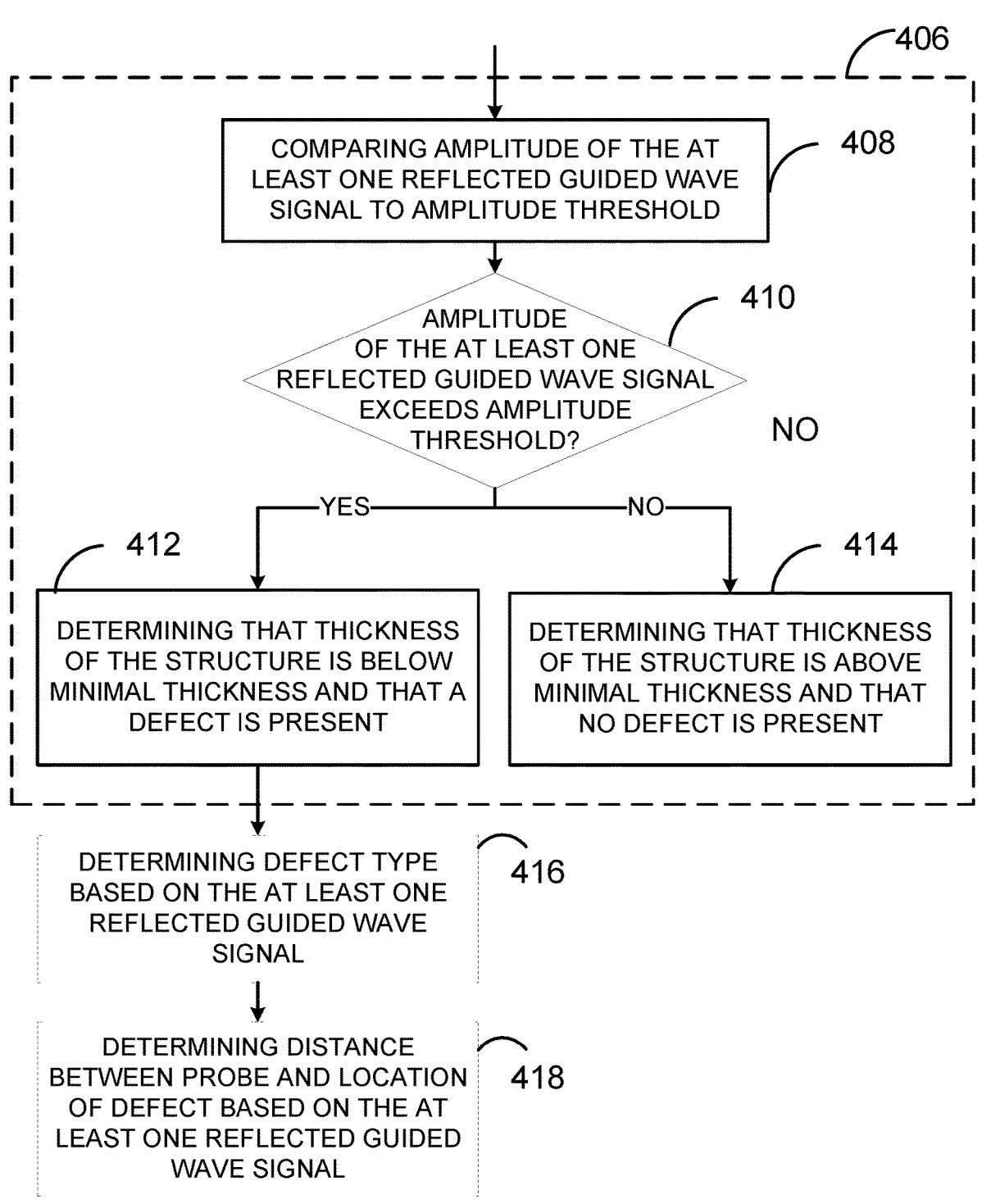

Referring now to FIG. 4A, an example nondestructive testing method 400 that uses the reflection of SH guided waves to determine a thickness profile of a structure, such as the structure 102 of FIG. 1, will now be described. At step 402, at least one ultrasonic probe is driven to cause at least one SH guided wave to propagate in a structure, in the manner described above with reference to FIGS. 1 to 3. At step 404, at least one reflected guided wave signal is received and a thickness of the structure is determined at step 406 based on an amplitude of the at least one reflected guided wave signal, as described herein above with reference to FIGS. 1 to 3. In particular and as illustrated in FIG. 4B, step 406 comprises, at step 408, comparing the amplitude of the at least one reflected guided wave signal to an amplitude threshold. At step 410, an assessment is made as to whether the amplitude of the at least one reflected guided wave signal exceeds the amplitude threshold. In other words, step 410 allows to determine whether the majority of the guided wave signal is transmitted or reflected, which is in turn indicative of whether the frequency-thickness product of the excited SH mode is above or below the cutoff frequency-thickness product and whether the thickness of the structure is above or below the minimal thickness. If it is determined at step 410 that the amplitude of the at least one reflected guided wave signal exceeds the amplitude threshold, the next step 412 comprises determining that the thickness of the structure is below the minimal thickness for the structure and that a defect is present. If it is determined at step 410 that the amplitude of the at least one reflected guided wave signal does not exceed (i.e. is above) the amplitude threshold, the next step 414 comprises determining that the thickness of the structure is above the minimal thickness and that no defect is present. In some embodiment, after the presence of a defect has been detected at step 412, the method 400 comprises a step 416 of determining the defect type based on the at least one reflected guided wave signal. The method 400 may further comprises a step 418 of determining a distance 295 between the probe and the location of the defect based on the at least one reflected guided wave signal.

Figure 4C:
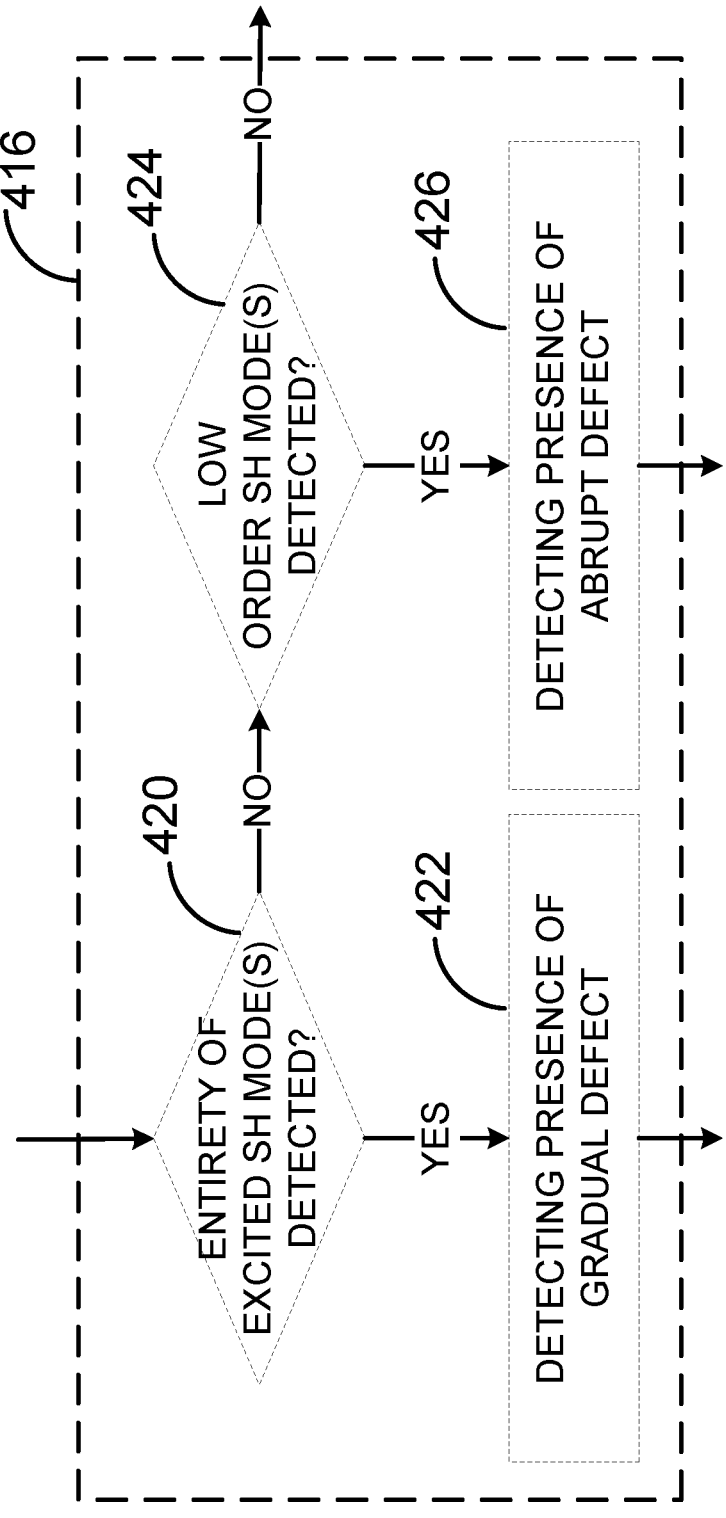

Referring now to FIG. 4C, in one embodiment, step 416 of determining the defect type comprises assessing at step 420 whether the entirety of the excited SH mode(s) has been detected. If this is the case, the next step 422 comprises detecting the presence of a gradual defect (i.e. exhibiting a continuous change in thickness). If it is determined at step 420 that the entirety of the excited SH mode(s) has failed to be detected, the next step 424 comprises assessing whether low order SH mode(s) have been detected. If this is the case, the next step 426 comprises detecting the presence of an abrupt detect. Otherwise, step 416 exits.

In order to validate the systems and methods described herein, Finite Element (FE) simulations may be used. An excitation with a 64-element phased array probe may be applied to nodes corresponding to a transducer having a 1 mm pitch between probe elements. A steel plate having a thickness of ⅜ inches may be used to model the structure under test. For this example, the minimal thickness for the structure may be set to 4 mm and the cutoff frequency-thickness product may be set to 5.7 mm. During the simulation, an SH guided wave is generated by a first probe (positioned on one side of the defect) and propagates in the modelled structure where the SH guided wave interacts with a defect. A reflected guided wave signal is detected by the first probe. A transmitted (or converted) guided wave signal may also be detected by a second probe positioned on an opposite side of the defect.

Figures 5A, 5B:
FIG. 5A illustrates simulation results for a structure having a defect and FIG. 5B illustrates simulation results for a structure having no defect, in accordance with an illustrative embodiment.

Simulation results are illustrated in FIGS. 5A and 5B, where $SH_4$ is the main mode that propagates through the simulated structure. Plot 502 of FIG. 5A illustrates that, when a defect is present in the structure, the probe (e.g., the first probe) detects a reflected guided wave signal in the opposite (or negative) direction as that of the propagating signal, the reflected guided wave signal having a significant amplitude (i.e. having an amplitude above the predetermined amplitude threshold). FIG. 5A further illustrates that the reflected guided wave signal has the same phase velocity in absolute value as the propagating signal. In contrast, plot 504 of FIG. 5B illustrates that, when no defect is present in the structure, the probe (e.g., the second probe) detects a transmitted guided wave signal in the same (or positive) direction as the propagating signal. Moreover a signal with negligible amplitude (i.e. having an amplitude below the amplitude threshold) may be detected in the opposite (or negative) direction.

Further FE simulations may be performed with a ⅜ inch steel plate and a 64-element phased array transducer with a pitch of 1.5 mm. For this example, a defect resulting in a minimal thickness going from 3.5 mm to 7.5 mm with a step of 0.5 mm was added in the middle of the steel plate. Similarly to the FE simulations described above with reference to FIGS. 5A and 5B, an SH guided wave is generated by a first probe (positioned on one side of the defect) and propagates in the modelled structure where the SH guided wave interacts with a defect. A reflected guided wave signal is detected by the first probe and a transmitted (or converted) guided wave signal may also be detected by a second probe positioned on an opposite side of the defect.

Simulation results are illustrated in of FIGS. 5C, 5D, 5E, and 5F. $SH_1$ was excited and scanned between 200 kHz and 500 kHz using multiple narrowband phased velocity excitation and its amplitude as a function of the frequency and the phase velocity when propagation is performed on a defect-less plate can be seen on plot 506 of FIG. 5C. Plots 508 of FIG. 5D and plot 510 of FIG. 5E show the amplitude of $SH_1$ reflected by the defect, with the minimum thickness being 3.5 mm and 5.5 mm, respectively. The detected cutoff frequencies are indicated by lines 5141 (at 420 kHz) and 5142 (at 270 kHz) in FIGS. 5D and 5E. Using equation (3) above, one can estimate the minimum thickness, which is 3.78 mm in the embodiment of FIG. 5D and 5.87 mm in the embodiment of FIG. 5E. Additional cases were simulated for minimum thicknesses ranging from 3.5 mm to 7.5 mm with a step of 0.5 mm and the results are shown in plot 512 of FIG. 5F. As can be seen from plot 512, among all the simulated cases, the maximum error is 0.44 mm, or less than 5% of the nominal thickness of the steel plate.

Figure 6:
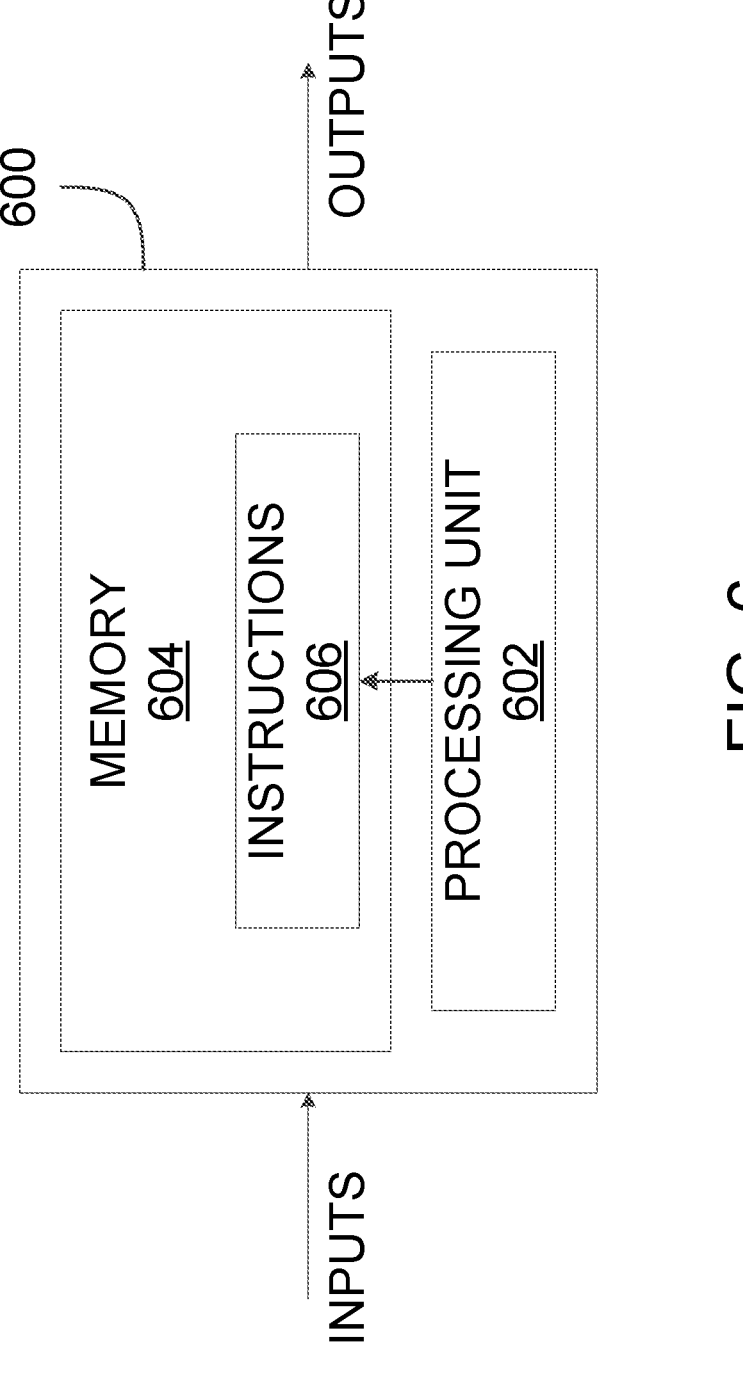
FIG. 6 is a block diagram of an example computing device, in accordance with an illustrative embodiment.

With reference to FIG. 6, an example of a computing device 600 is illustrated. For simplicity only one computing device 600 is shown but more computing devices 600 operable to exchange data may be provided. The computing devices 600 may be the same or different types of devices. The electronic circuitry used for generating and detecting the SH waves (e.g., the signal generating circuit 202 and/or the signal receiving circuit 204 of FIG. 2) and/or the method (reference 400 of FIG. 4) may be implemented with one or more computing devices 600). The computing device 600 may also be used to control operation of the probe 110 described herein with reference to FIGS. 1 to 3. Other embodiments may also apply.

The computing device 600 comprises a processing unit 602 and a memory 604 which has stored therein computer-executable instructions 606. The processing unit 602 may comprise any suitable devices configured to implement the method 400 such that instructions 606, when executed by the computing device 600 or other programmable apparatus, may cause the functions/acts/steps performed as part of the method 400 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems described herein may be implemented in a high level procedural or object oriented programming or scripting language, or a combination thereof, to communicate with or assist in the operation of a computer system, for example the computing device 600. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

As can be understood, the examples described above and illustrated are intended to be exemplary only. Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for nondestructive testing of a structure, the method comprising:

driving at least one ultrasonic probe to cause at least one shear horizontal (SH) guided wave to propagate in the structure;

receiving at least one reflected guided wave signal from the structure in response to driving the at least one ultrasonic probe;

performing a comparison between an amplitude of the at least one reflected guided wave signal and an amplitude threshold; and determining a thickness of the structure based on the comparison and detecting, based on the thickness as determined, a presence or an absence of at least one defect in the structure.

2. The method of claim 1, wherein driving the at least one ultrasonic probe comprises causing the at least one ultrasonic probe to excite high order SH guided wave modes at a constant phase velocity.

3. The method of claim 1, wherein driving the at least one ultrasonic probe comprises causing at least one comb transducer to excite SH guided wave modes using comb excitation.

4. The method of claim 1, wherein driving the at least one ultrasonic probe comprises driving at least one electromagnetic acoustic transducer (EMAT).

5. The method of claim 4, wherein driving the at least one ultrasonic probe comprises driving an EMAT array.

6. The method of claim 1, wherein driving the at least one ultrasonic probe comprises driving a phased array probe.

7. The method of claim 1, wherein determining the thickness of the structure comprises, upon determining, based on the comparison between the amplitude of the at least one reflected guided wave signal and the amplitude threshold, that the amplitude of the at least one reflected guided wave signal exceeds the amplitude threshold, determining that the thickness of the structure at a location of the at least one defect is below a minimal thickness for the structure and detecting the presence of the at least one defect in the structure.

8. The method of claim 7, further comprising determining that the at least one reflected guided wave signal comprises an entirety of excited modes of the at least one SH guided wave, and that the at least one defect exhibits a continuous change in thickness.

9. The method of claim 7, further comprising determining that the at least one reflected guided wave signal comprises at least one low order mode of the at least one SH guided wave, and that the at least one defect exhibits a discontinuous change in thickness.

10. The method of claim 7, further comprising determining a group velocity of the at least one reflected guided wave signal, determining an amount of time elapsed between generation of the at least one SH guided wave signal and receipt of the at least one reflected guided wave signal, and computing a product of the group velocity and the amount of time to determine a distance between the at least one ultrasonic probe and a location of the at least one defect.

11. The method of claim 1, wherein determining the thickness of the structure comprises, upon determining, based on the comparison between the amplitude of the at least one reflected guided wave signal and the amplitude threshold, that the amplitude of the at least one reflected guided wave signal is below the amplitude threshold, determining that the thickness of the structure exceeds a minimal thickness for the structure and detecting the absence of the at least one defect in the structure.

12. A system for nondestructive testing of a structure, the system comprising:

an ultrasonic probe configured to be coupled to the structure and to cause, when driven, at least one shear horizontal (SH) guided wave to propagate in the structure;

a processing unit; and a non-transitory computer-readable medium having stored thereon instructions executable by the processing unit for:

driving the at least one ultrasonic probe;

receiving at least one reflected guided wave signal from the structure in response to driving the at least one ultrasonic probe;

performing a comparison between an amplitude of the at least one reflected guided wave signal and an amplitude threshold; and determining a thickness of the structure based on the comparison and detecting, based on the thickness as determined, a presence or an absence of at least one defect in the structure.

13. The system of claim 12, wherein the at least one ultrasonic probe, when driven, is caused to excite high order SH guided wave modes at a constant phase velocity.

14. The system of claim 12, wherein the at least one ultrasonic probe comprises at least one comb transducer configured to, when driven, excite SH guided wave modes using comb excitation.

15. The system of claim 12, wherein the at least one ultrasonic probe comprises at least one electromagnetic acoustic transducer (EMAT).

16. The system of claim 15, wherein the at least one ultrasonic probe comprises an EMAT array.

17. The system of claim 12, wherein the at least one ultrasonic probe comprises a phased array probe.

18. The system of claim 12, wherein the instructions are executable by the processing unit for determining the thickness of the structure comprising, upon determining, based on the comparison between the amplitude of the at least one reflected guided wave signal and the amplitude threshold, that the amplitude of the at least one reflected guided wave signal exceeds the amplitude threshold, determining that the thickness of the structure at a location of the at least one defect is below a minimal thickness for the structure and detecting the presence of the at least one defect in the structure.

19. The system of claim 18, wherein the instructions are executable by the processing unit for determining a group velocity of the at least one reflected guided wave signal, determining an amount of time elapsed between generation of the at least one SH guided wave signal and receipt of the at least one reflected guided wave signal, and computing a product of the group velocity and the amount of time to determine a distance between the at least one ultrasonic probe and a location of the at least one defect.

20. The system of claim 12, wherein the instructions are executable by the processing unit for determining the thickness of the structure comprising, upon determining, based on the comparison between the amplitude of the at least one reflected guided wave signal and the amplitude threshold, that the amplitude of the at least one reflected guided wave signal is below the amplitude threshold, determining that the thickness of the structure exceeds a minimal thickness for the structure and detecting the absence of the at least one defect in the structure.

\* \* \* \* \*